March 22, 1938.  W. J. OOTHOUT  2,111,937
LEASE FORMING MECHANISM
Filed July 27, 1935   7 Sheets-Sheet 1
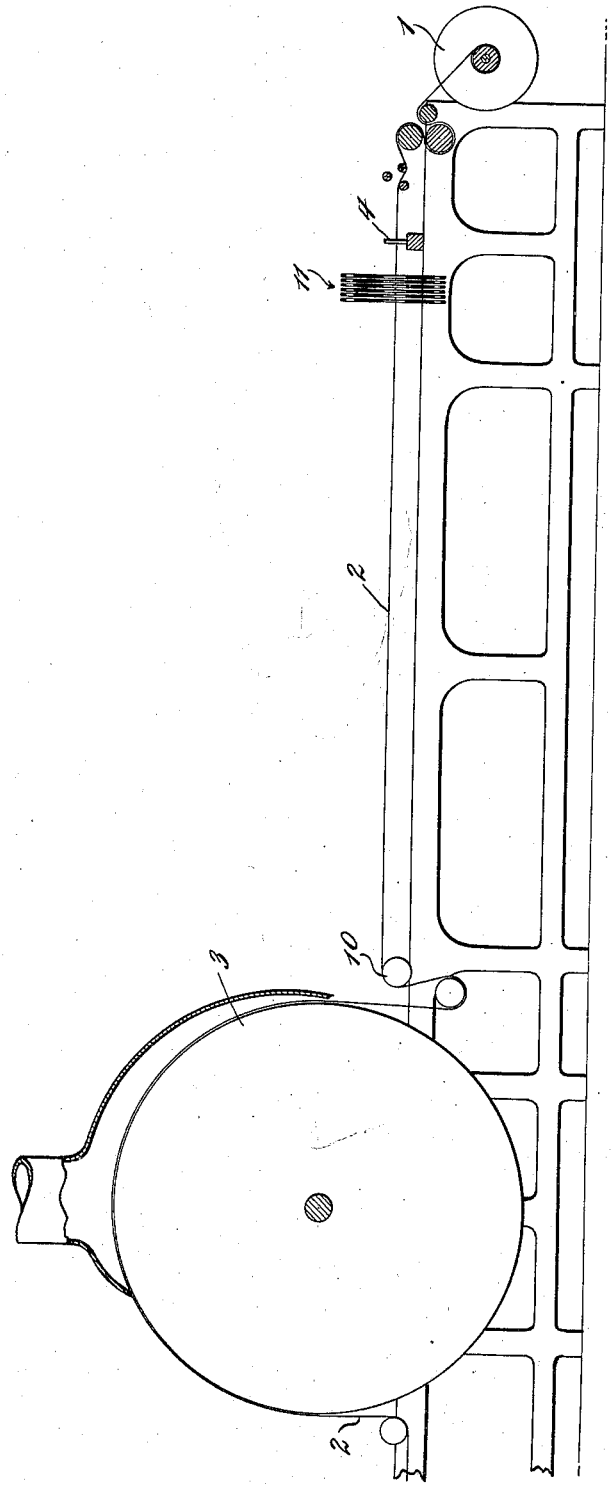
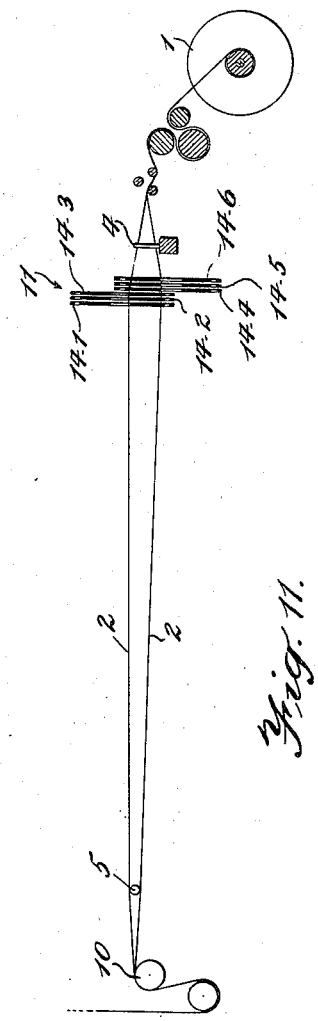
INVENTOR.
William J. Oothout
BY
Gifford, Scull & Burgess
ATTORNEYS.

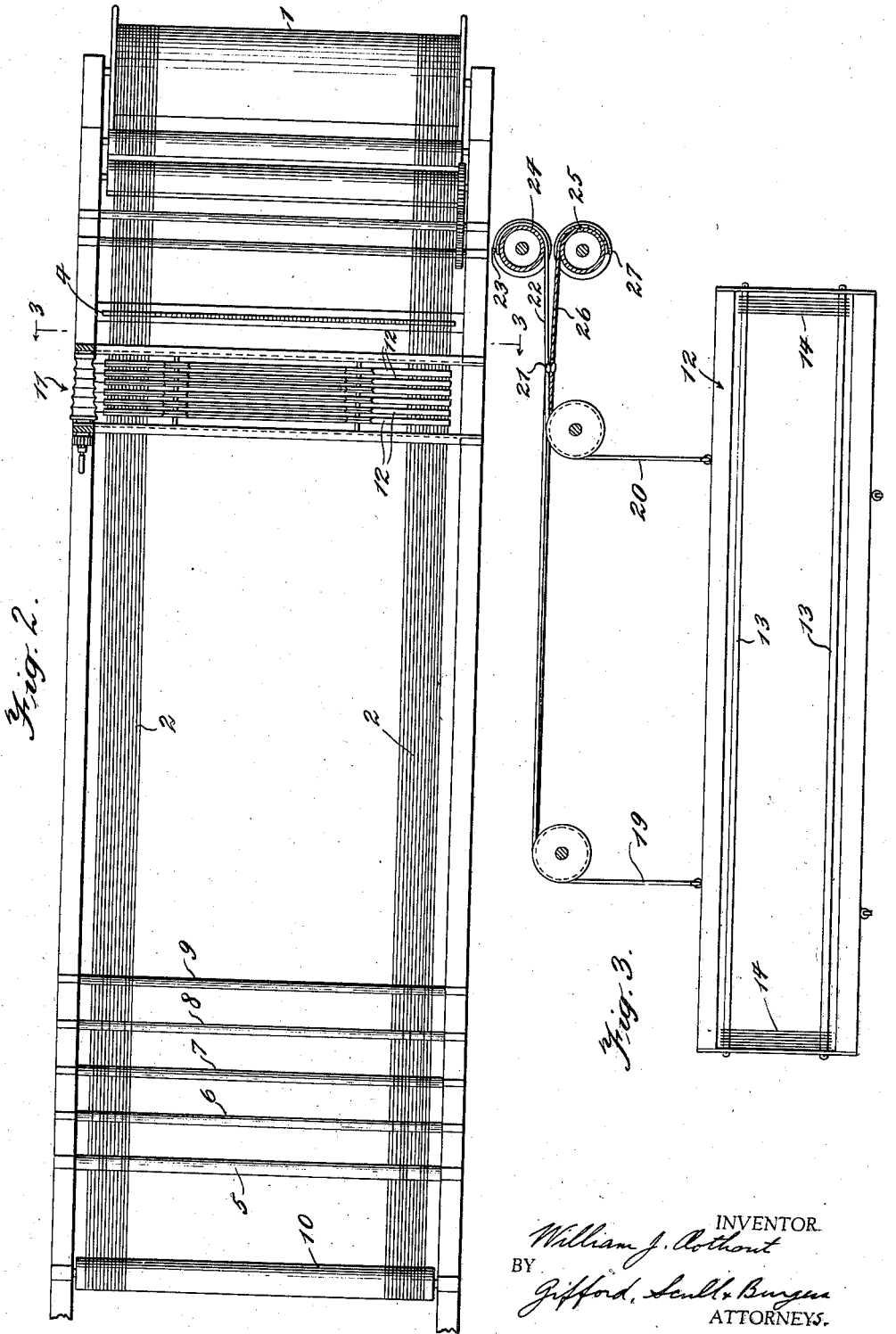

March 22, 1938.  W. J. OOTHOUT  2,111,937
LEASE FORMING MECHANISM
Filed July 27, 1935  7 Sheets-Sheet 3
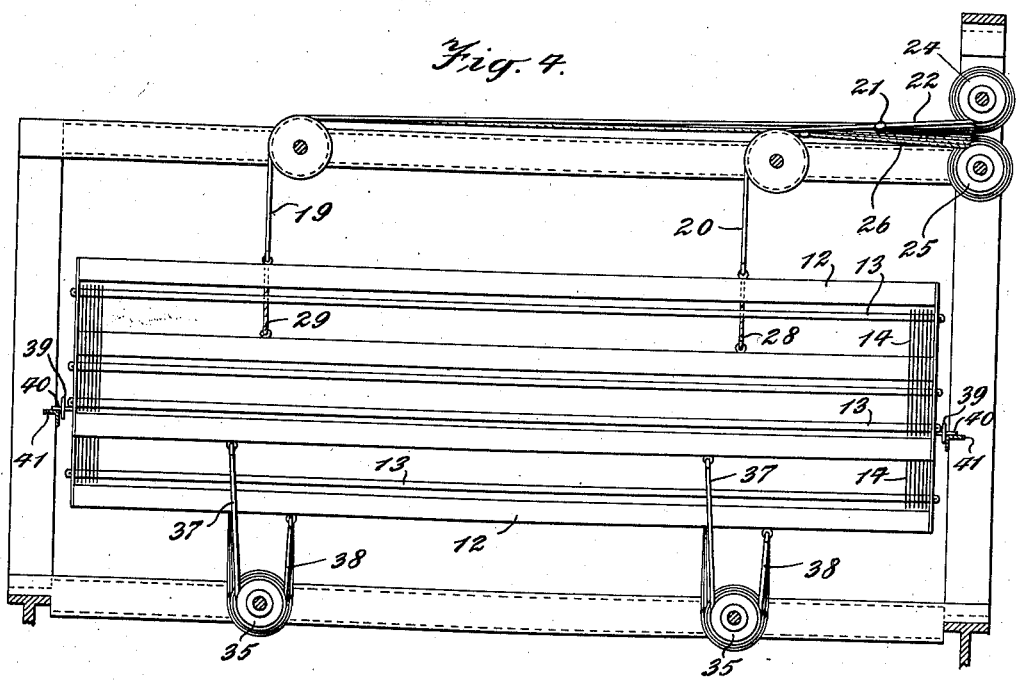
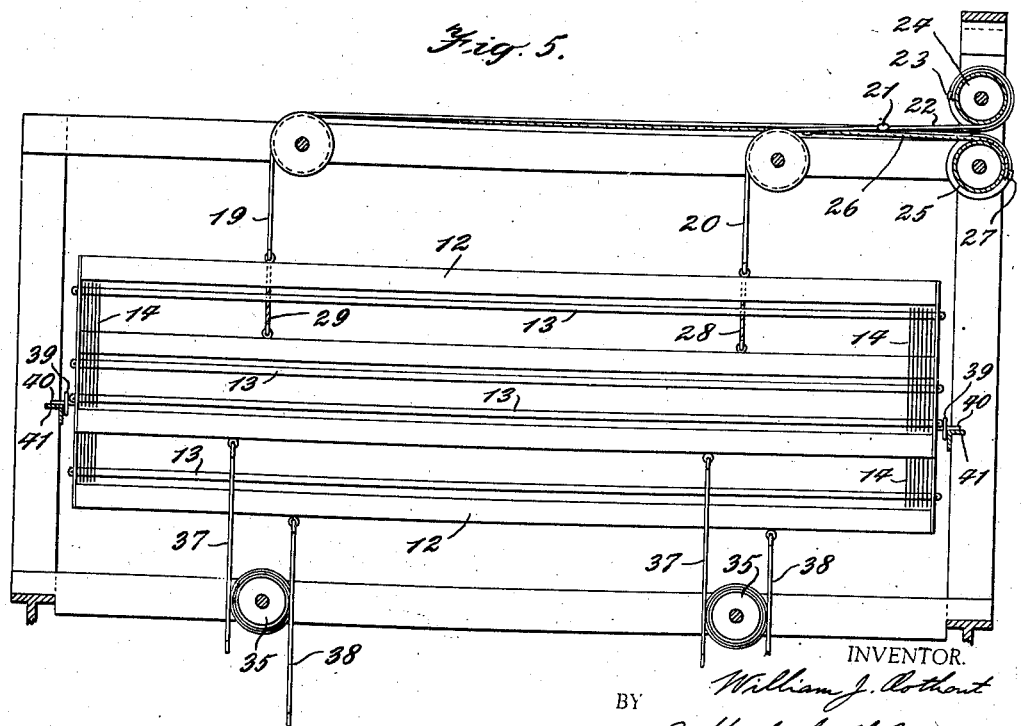
INVENTOR.
William J. Oothout
BY Gifford, Scull & Burgess
ATTORNEYS.

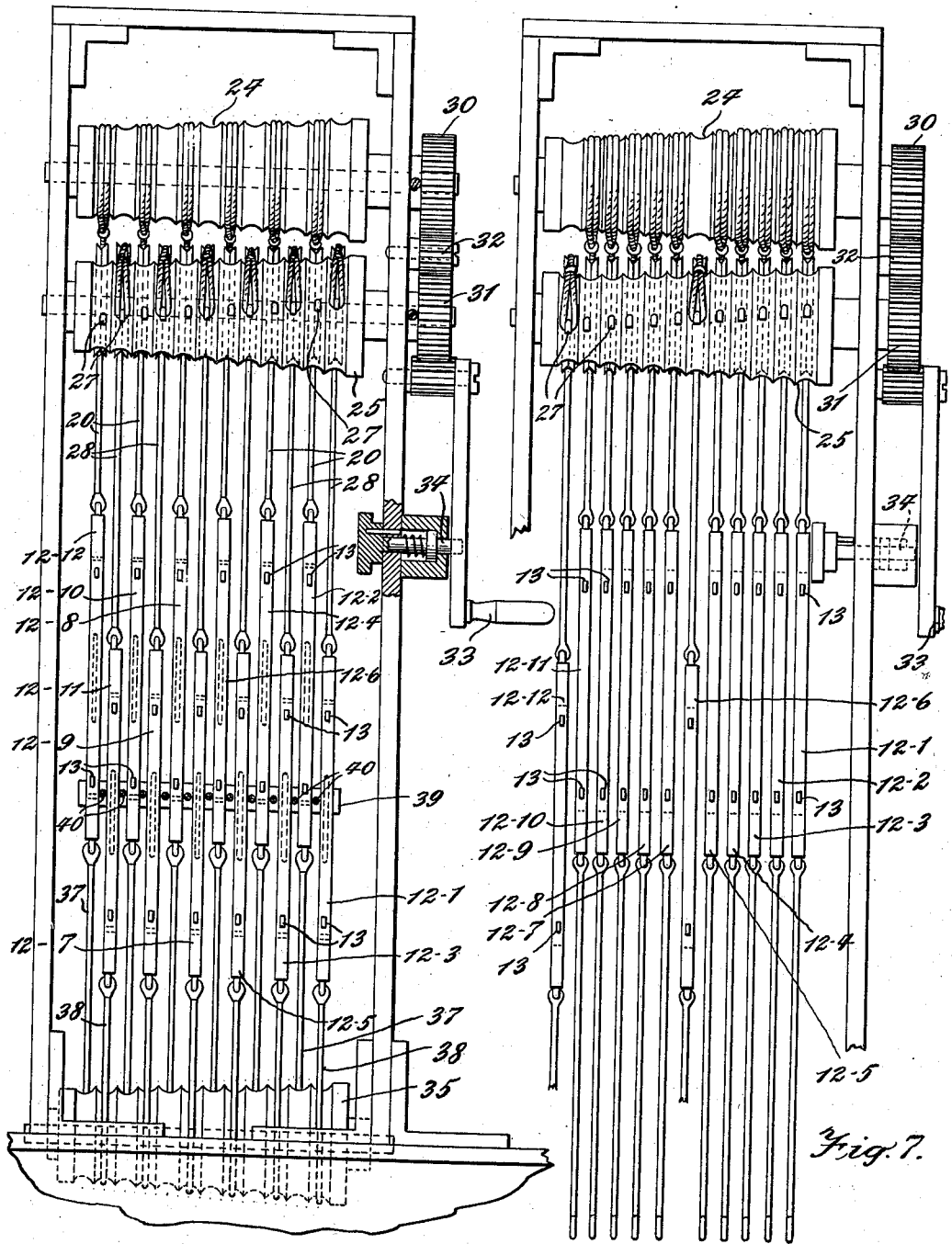

March 22, 1938.                W. J. OOTHOUT                2,111,937
                          LEASE FORMING MECHANISM
                            Filed July 27, 1935              7 Sheets-Sheet 5

INVENTOR.
William J. Oothout
BY
Gifford, Scull & Burgess
ATTORNEYS.

March 22, 1938.  W. J. OOTHOUT  2,111,937
LEASE FORMING MECHANISM
Filed July 27, 1935  7 Sheets-Sheet 6

INVENTOR.
William J. Oothout
BY
Gifford, Scull & Burgess
ATTORNEYS.

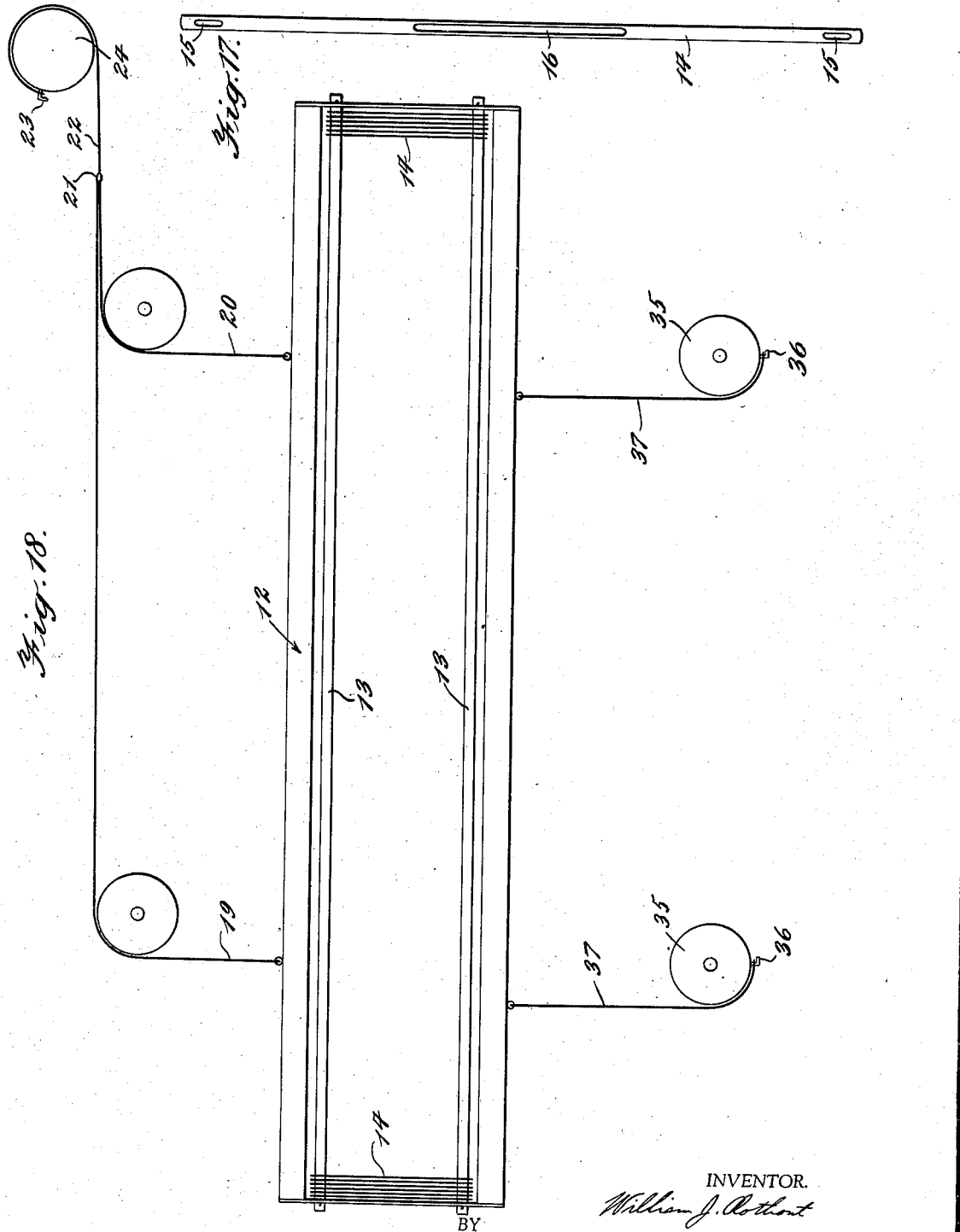

Patented Mar. 22, 1938

2,111,937

UNITED STATES PATENT OFFICE 2,111,937

LEASE FORMING MECHANISM

William J. Oothout, Queens Village, N. Y.

Application July 27, 1935, Serial No. 33,478

4 Claims. (Cl. 28—40)

This invention relates to a novel and improved form of lease-forming mechanism, the novel features of which will be best understood from the following description and the annexed drawings, in which I have shown a selected embodiment of the invention and in which:

Fig. 1 is an elevation of one end of a slasher having my invention applied thereto, this figure being diagrammatic in character and showing the arrangement of threads before insertion of the separating rods;

Fig. 2 is a plan view of the structure appearing in Fig. 1 and showing the threads after the insertion of the separating rods;

Fig. 3 is a view taken approximately on the line 3—3 of Fig. 2, parts being omitted;

Figs. 4 and 5 are views corresponding to Fig. 3, but showing the parts in different positions;

Fig. 6 is a view on an enlarged scale taken approximately on the same plane and showing a slight modification of the structures of Figs. 3, 4, and 5 as viewed from the right of those figures.

Fig. 7 is a view of the structure of Fig. 6 but showing the parts in different positions;

Figure 8:
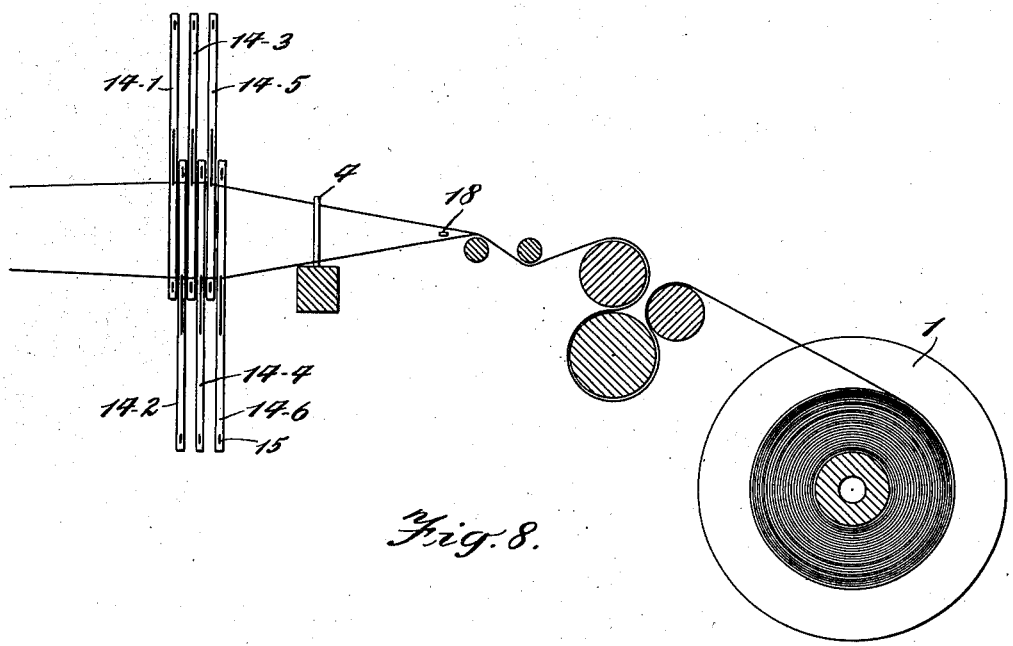
Figure 9:
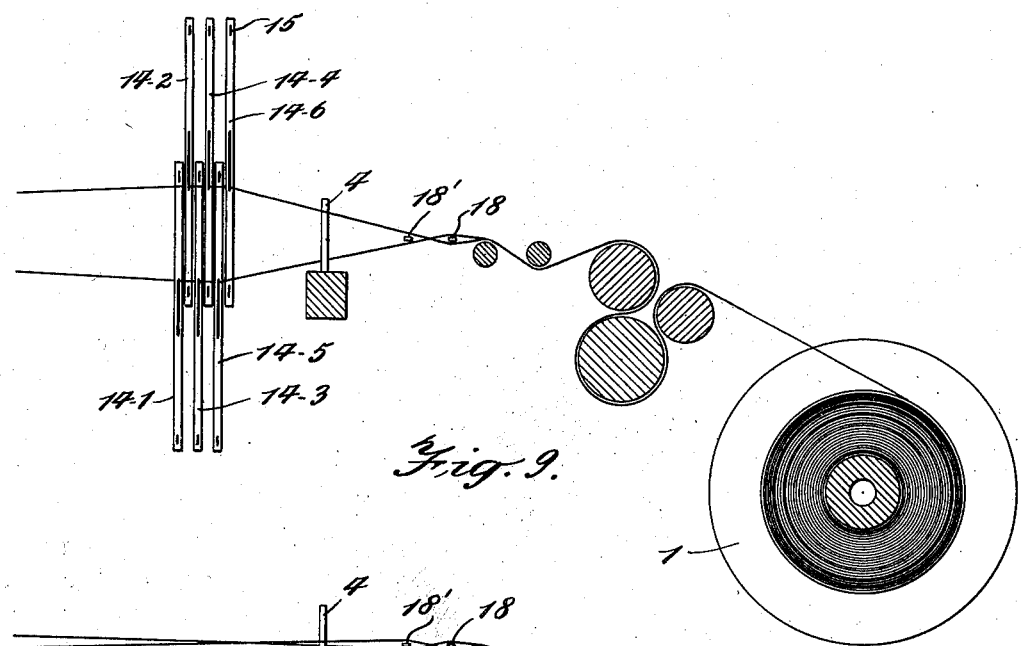
Figure 10:
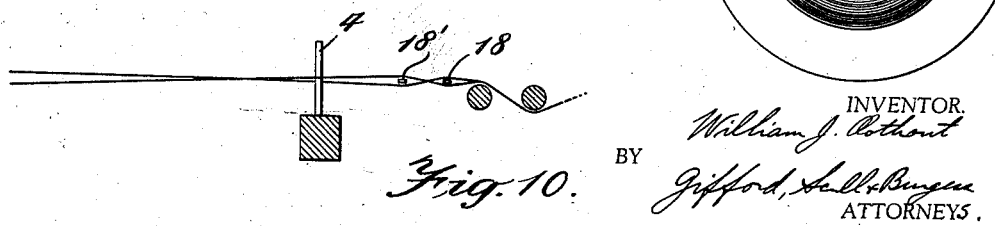

Figs. 8, 9, and 10 are diagrammatic views showing the structure appearing at the right of Fig. 1 and indicating how a lease is formed according to my invention;

Figs. 11 to 16, inclusive, are diagrammatic views of part of the structure appearing in Fig. 1 and illustrating the use of my invention in connection with placing of the separating rods;

Fig. 17 is a face view of a novel form of heddle forming part of my invention;

Fig. 18 is a view on an enlarged scale showing details of the frame-operating arrangement.

Referring first to Figs. 1 and 2, I have shown my invention as applied to a slasher wherein warp threads in preparation for the loom have been subjected to a bath of sizing material, although the invention may be used with any other machine in which threads are to be wound upon a beam. The details of the slasher are immaterial to the practice of my invention, and therefore many of these details have been omitted.

As is well known in the art, a plurality of section beams, each having warp threads thereon, are used to form a loom beam. In Figs. 1 and 2 such a loom beam is indicated at 1 rotatably mounted at one end of the machine and rotated by any suitable mechanism, not shown. The threads 2 are shown as arranged in what is termed a "warp", and as being wound upon the loom beam after leaving the drying cylinder 3 of the slasher, it being understood that before these threads pass over the drying cylinder they have been passed through the usual sizing bath. Before passing to the loom beam, the threads pass through a comb 4.

According to my invention, which may be used with threads of any material, I place adjacent the comb a device which may be used to form what is technically known as a lease when the loom beam has been completely wound with the warp threads, or at any other desired time. When the beam has been thus wound, the threads are cut, and it is particularly desirable at that time to separate the thread ends so that when they are started through the loom, each thread may be readily handled. This may be done by inserting lease bands between adjacent threads, and I provide means adjacent the comb for raising alternate threads at the same time that I simultaneously depress the threads between these alternate threads. The lease band may then be inserted between the raised and depressed threads, after which the operation may be reversed, depressing the threads which have been raised and raising the threads which have been depressed, after which a second lease band may be inserted between the thread and secured by tying or otherwise.

The same means which is used for raising and depressing the threads may be used for inserting separating rods commonly used in a slasher and which are designated 5, 6, 7, 8, and 9. These separating rods are used, as is well known in the art, to separate the threads so as to be sure that they are not held together by the sizing on the threads.

In Fig. 1 the warp threads are shown as just having been attached to the loom beam 1, and in this condition the threads will be all substantially in one horizontal plane between the roller 10 and the comb 4. Adjacent the comb 4 and between the comb and the roller 10 I place a harness 11 consisting of a plurality of frames 12, here shown as six in number.

As best shown in Fig. 3, each frame comprises upper and lower bars 13 upon which are mounted heddles 14. Each heddle is provided adjacent its ends with slots 15 to receive the bars 13 and, as is well known in the art, the slots 15 are of greater width than the thickness of the bars 13, so that the heddles may swing on the bars, so that the plane of a heddle will be inclined to the direction of travel of the threads therethrough. Centrally of the heddle and symmetrically disposed with respect to its ends, I provide an elongated slot 16 through which a thread may pass. The purpose of this arrangement will be more fully described presently. By placing a harness at the position indicated, a workman may readily reach it for adjustment of the various parts of the harness.

Each thread is lead through one of the slots 16 in one of the heddles on one of the six frames, and in normal operation they run freely therethrough. Therefore no substantial variation in the width of the warp occurs between the drum and the comb, and the threads in the warp are substantially straight between these two points, as plainly seen in Fig. 2. From an inspection of Fig. 16 it will be seen that the slots are of such height that after the threads are separated by the separating rods, there is ample room for the threads of the shed to pass through the slots without interference with the walls thereof, particularly at the ends of the slots, which ends are out of contact with the threads except when the heddles are used to raise or depress the threads passing therethrough, as described below.

Figure 12:
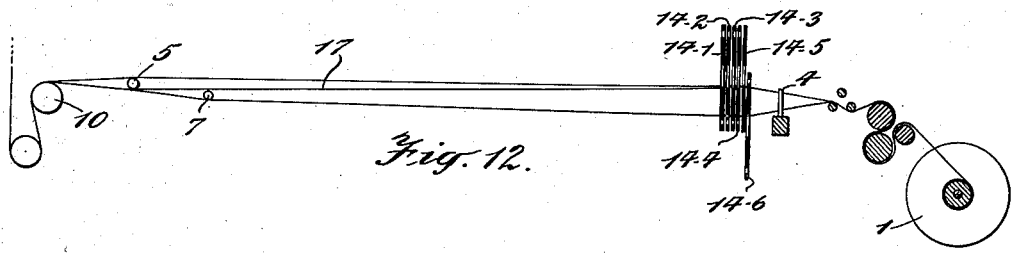
Figure 13:
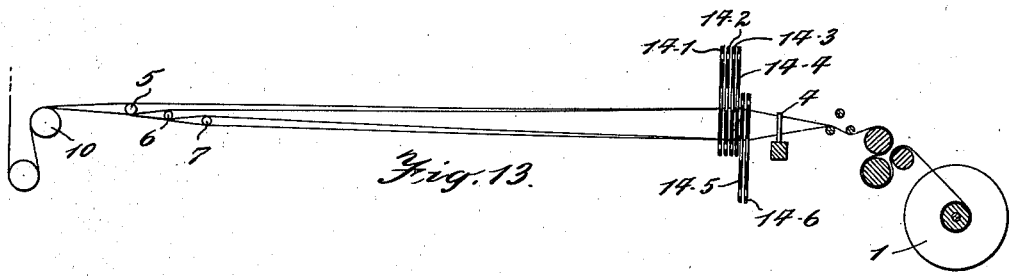
Figure 14:
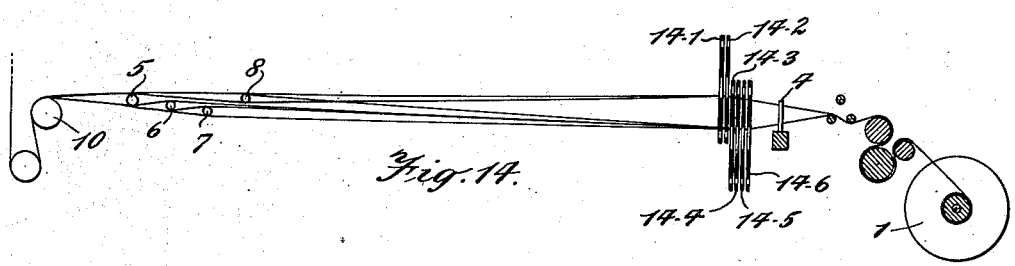
Figure 15:
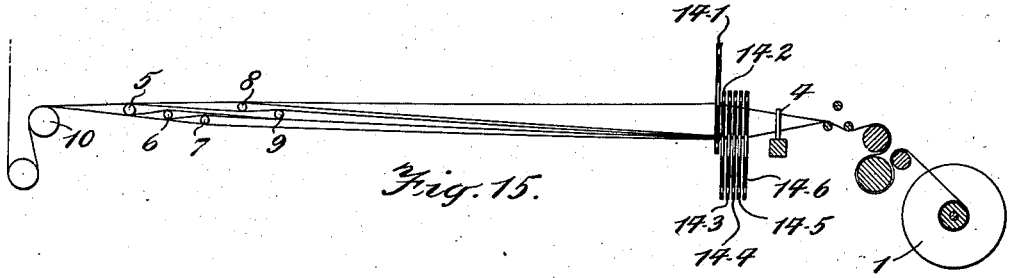
Figure 16:
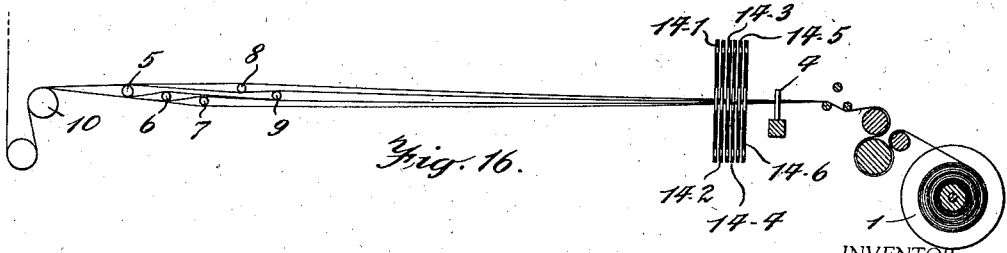

Referring now to Figs. 11 to 16, inclusive, I will describe briefly how the separating rods are inserted. The heddle frames may be raised or lowered by means to be described later, and in Fig. 11 I have shown three out of six frames being raised while the other three are simultaneously depressed. Since each heddle receives only one thread in its slot, this operation results in raising half of the threads and depressing the other half so that a separating rod 5 may be put in place. Then, as shown in Fig. 12, two more of the depressed frames are raised, thereby raising the threads 17 which had been previously depressed, after which the separating rod 7 is inserted. Then by subsequently depressing the frames which have been raised, the other separating rods may be put in place until the arrangement shown in Fig. 16 is achieved.

Whenever it is desired to take a lease on the threads, I may perform the operations indicated in Figs. 8, 9, and 10. In Fig. 8 I have shown three heddles raised and three depressed, it being understood that each heddle shown in this figure and also in the other diagrammatic figures represents all the heddles in one frame 12. These frames are numbered, respectively, 14—1 to 14—6, inclusive, and the heddles shown in the various diagrams are numbered correspondingly.

The heddles that are raised are so selected that they will raise with them alternate ones of the threads, while the heddles that are depressed will depress the other, intermediate threads. The amount by which half of the threads are raised is the same amount by which the other half is depressed, and by thus moving all threads an equal amount out of their normal positions, all threads are maintained at the same tension, which is not true in lease-forming devices wherein certain threads are left in a normal position while others are displaced therefrom.

After the threads have been brought to the position shown in Fig. 8, a lease band 18 may be inserted, as indicated, between the raised and lowered threads, and then the heddle positions may be reversed to the position indicated in Fig. 9 so that the threads which have been raised in Fig. 8 are depressed in Fig. 9 and vice versa. A second lease band 18' may then be inserted and the threads brought back to their normal position indicated in Fig. 10. Then, if desired, threads may be cut at some point to the left of the lease band as they appear in Figs. 8, 9, and 10, in which event the thread ends will be maintained in their proper position by the lease bands. If the lease is being taken after the beam is wound, normally the winding will continue sufficiently to bring the lease bands to a position adjacent the loom beam.

The means for raising and lowering the frames will now be described. In Fig. 2 I have shown six frames, whereas in Figs. 6 and 7 I have shown twelve. The six-frame arrangement will ordinarily be sufficient, but in case more separating rods are desired, the twelve-frame arrangement may be used or in fact any arrangement using any desired number of frames.

Each frame is shown as being supported by two cables 19 and 20 connected together at 21 to a third cable 22 which is hooked at 23 to an upper drum 24. As plainly shown in Figs. 6 and 7, alternate frames are connected to the upper drum 24, whereas the intermediate frames are connected to a lower drum 25, the lower drum likewise having a cable 26 secured thereto by hooks 27 and separating into cables 28 and 29. The two drums are provided with pinions 30 and 31 meshing with an idler 32 so that the two pinions will rotate in the same directions, rotation being caused by operation of a handle 33 which may be releasably locked by a plunger 34.

Since the cables 22 and 26 are passed over these respective drums in opposite directions, rotation of these drums in the same direction will cause a winding up of one cable and a paying out of the other, so that the alternate frames will be raised and the intermediate frames lowered. During the movement of the frames, they are maintained taut by means of drums 35 disposed beneath the frames and provided with hooks 36 connected to two adjacent frames by cables 37 and 38.

The two drums are made conical, as shown, so that pulleys of varying sizes are provided to move the frames differing amounts, to compensate for the angle of the shed formed by the threads passing through the heddle slots.

I preferably provide a spacing means comprising a support 39 on which are supported spacing rods 40 extending between adjacent frames, the rods resting upon end supports 41. These spacing rods serve to maintain the adjacent frames out of contact with each other and prevent the heddles in one frame from being forced against those in another frame when, for example, some irregularity in a thread passes through the heddles when the heddles are in neutral position.

When the apparatus is used for forming a lease, it is in the condition shown in Fig. 6, in which the frames are equally divided between the two drums 24 and 25. However, when the operation of placing the separating rods is to be performed, the various cables may be changed so as to engage other drums. For example, in Fig. 7 I have shown an arrangement wherein five out of six of the frames will be raised and the others lowered, by changing the arrangements of the various cables both above and below the frames.

From the above it will be seen that I have provided an apparatus which will perform the desired functions in an efficient manner, and which may be readily used on any beam-forming machine. It will also be seen that the apparatus is selective in character, so that individual frames may be lifted or depressed at will, and that while normally the lifting of one frame is accompanied by the depressing of an adjacent frame, nevertheless by disconnecting those two frames, it may be operated independently of the other.

While I have shown the invention as embodied in a specific form, it is to be understood that various changes in details may be made without departing from the scope of the invention, as defined by the appended claims.

I claim:

1. In a warp-beaming machine, a drying drum over which the warp passes, a loom beam upon which the warp is wound after leaving the drum, a comb between the drum and beam and adjacent the beam, a lease-forming harness between the drying drum and the beam and adjacent the comb and extending the full width of the warp, said harness comprising a plurality of frames spaced lengthwise of the warp and each frame carrying a plurality of heddles swinging thereon, whereby the planes of the heddles may be inclined to the direction of travel of the threads therethrough, and each heddle having a centrally disposed elongated slot to receive a single thread, each thread normally being located out of contact with the ends of said slots when the threads are being wound on the beam and the threads then running substantially freely through said slots, means separating said threads at a distance from the harness, whereby they pass through the harness at various angles, and means to raise or depress a plurality of said frames from normal position by different amounts, to compensate for said angles when the threads are not being wound, said slots having such length that the ends thereof will clear the threads therein when the frames are in their normal positions and threads are being wound on the beam and may engage and move said threads from their normal positions when the heddles are raised or depressed.

2. In a warp-beaming machine, a drying drum over which the warp passes, a loom beam upon which the warp is wound after leaving the drum, a comb between the drum and beam and adjacent the beam, a lease-forming harness between the drying drum and the beam and adjacent the comb and extending the full width of the warp, said harness comprising a plurality of frames spaced lengthwise of the warp and each frame carrying a plurality of heddles swinging thereon, whereby the planes of the heddles may be inclined to the direction of travel of the threads therethrough, and each heddle having a centrally disposed elongated slot to receive a single thread, each thread normally being located out of contact with the ends of said slots when the threads are being wound on the beam and the threads then running substantially freely through said slots, means for raising certain heddle frames and depressing others from normal position, means for reversing said operations to depress said certain frames and to raise said other frames from normal position, and means for varying the frames to be raised and those to be depressed in either one of said operations when the threads are not being wound, said slots having such length that the ends thereof will clear the threads therein when the frames are in their normal positions and threads are being wound on the beam and may engage and move said threads from their normal positions when the heddles are raised or depressed.

3. In a warp-beaming machine, a drying drum over which the warp passes, a loom beam upon which the warp is wound after leaving the drum, a comb between the drum and beam and adjacent the beam, a lease-forming harness between the drying drum and the beam and adjacent the comb and extending the full width of the warp, said harness comprising a plurality of frames spaced lengthwise of the warp and each frame carrying a plurality of heddles swinging thereon, whereby the planes of the heddles may be inclined to the direction of travel of the threads therethrough, and each heddle having a centrally disposed elongated slot to receive a single thread, each thread normally being located out of contact with the ends of said slot when the threads are being wound on the beam and the threads then running substantially freely through said slots, means to raise or depress individual frames from normal position when the threads are not being wound, said slots having such length that the ends thereof will clear the threads therein when the frames are in their normal positions and threads are being wound on the beam and may engage and move said threads from their normal positions when the heddles are raised or depressed, and spacing members maintaining said heddle frames spaced lengthwise of the warp.

4. In a warp-beaming machine, a drying drum over which the warp passes, a loom beam upon which the warp is wound after leaving the drum, a comb between the drum and beam and adjacent the beam, a lease-forming harness between the drying drum and the beam and adjacent the comb and extending the full width of the warp, said harness comprising a plurality of frames spaced lengthwise of the warp and each frame carrying a plurality of heddles swinging thereon, whereby the planes of the heddles may be inclined to the direction of travel of the threads therethrough, and each heddle having a centrally disposed elongated slot to receive a single thread, each thread normally being located out of contact with the ends of said slots when the threads are being wound on the beam and the threads then running substantially freely through said slots, means separating said threads at a distance from the harness, whereby they pass through the harness at various angles, and means to raise or depress a plurality of said frames from normal position by different amounts, to compensate for said angles when the threads are not being wound, said means comprising two conical pulleys extending lengthwise of the warp and having their axes parallel, cables each detachably secured to one of said pulleys and connected to one of said frames, and means for rotating said pulleys in unison and in opposite directions, said slots having such length that the ends thereof will clear the threads therein when the frames are in their normal positions and threads are being wound on the beam and may engage and move said threads from their normal positions when the heddles are raised or depressed.

WILLIAM J. OOTHOUT.